United States Patent
Unishi et al.

[19]

[11] Patent Number: 6,048,115
[45] Date of Patent: *Apr. 11, 2000

[54] PRINTING APPARATUS AND PRINTING PROCESSING METHOD

[75] Inventors: Masaki Unishi, Tokyo; Satoshi Nagata, Tama; Yoshifumi Okamoto; Tetsuya Morita, both of Yokohama; Akihiro Shimura; Shunya Mitsuhashi, both of Tokyo; Nobuhiko Sato, Yokohama; Takanori Nishijima, Tokyo, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/566,659

[22] Filed: Dec. 4, 1995

Related U.S. Application Data

[63] Continuation of application No. 08/206,837, Mar. 7, 1994, abandoned.

[30] Foreign Application Priority Data

| Mar. 8, 1993 | [JP] | Japan | 5-046630 |
| Feb. 24, 1994 | [JP] | Japan | 6-026577 |

[51] Int. Cl.$^7$ ........................... B41J 3/42
[52] U.S. Cl. ........................... 400/74; 400/54
[58] Field of Search ........................... 400/54, 74, 76, 400/70, 61

[56] References Cited

U.S. PATENT DOCUMENTS

| 4,317,629 | 3/1982 | Kuseski | 355/24 |
| 5,018,081 | 5/1991 | Yamaguchi et al. | 400/76 |

FOREIGN PATENT DOCUMENTS

| 0033453 | 8/1981 | European Pat. Off. | 400/74 |
| 146780 | 6/1989 | Japan | 400/74 |
| 1227168 | 9/1989 | Japan | 400/74 |
| 2-150375 | 6/1990 | Japan . | |
| 202468 | 8/1990 | Japan | 400/74 |
| 2-277652 | 11/1990 | Japan | 400/74 |
| 3-26561 | 2/1991 | Japan . | |
| 3-155974 | 7/1991 | Japan | 400/74 |
| 3155974 | 7/1991 | Japan | 400/74 |
| 93282 | 3/1992 | Japan | 400/61 |
| 4-298372 | 10/1992 | Japan | 400/74 |
| 5162409 | 6/1993 | Japan | 400/74 |
| 5233177 | 9/1993 | Japan | 400/74 |
| 6-015895 | 1/1994 | Japan . | |
| 6-320805 | 11/1994 | Japan . | |

*Primary Examiner*—John S. Hilten
*Assistant Examiner*—Charles H. Nolan, Jr.
*Attorney, Agent, or Firm*—Fitzpatrick, Cella, Harper & Scinto

[57] ABSTRACT

A printing apparatus and a printing processing method are provided in which content of print information is discriminated. A variable is initialized if the result of discrimination indicates the start of a printing job, and the variable is counted up of the result of discrimination indicates start of the next page. In a case where trouble such as jamming occurs during processing of this print information, at which page from the start of printing this trouble occurred is calculated from the variable, and the page number obtained is outputted upon being incorporated in information indicative of the fact that trouble has occurred. As a result, it is possible to output information indicating at which page, from the start of a printing job, trouble such as jamming occurred.

10 Claims, 4 Drawing Sheets

PRINTING APPARATUS AND PRINTING PROCESSING METHOD

This application is a continuation of application Ser. No. 08/206,837 filed Mar. 7, 1994, now abandoned.

BACKGROUND OF THE INVENTION

1. Field of the Invention

This invention relates to a printing apparatus and a printing processing method. More particularly, the invention relates to a printing apparatus and printing processing method for outputting trouble-related information, such as information indicative of paper jamming, by way of example.

2. Description of the Related Art

When an apparatus such as a printer develops trouble such as paper jamming, a technique is available according to which information indicating how many pages prior to the page currently being processed the problem occurred is sent back to the computer that issued the print instruction. However, the problem described below arises with this technique.

Specifically, the information sent back by the printer may indicate "jamming occurred X pages prior to page now being processed"; it does not indicate the number of the page from the start of the printing job at which the trouble occurred. Accordingly, the computer that has received this information must calculate, on the basis thereof, the number of the page at which the trouble occurred. The calculation is especially complicated if printing is performed on both sides of a page.

SUMMARY OF THE INVENTION

The present invention seeks to provide a printing apparatus and a printing processing method that solve the aforementioned problem, and an object thereof is to make it unnecessary for a computer or the like, which has issued the print instruction, to calculate the number of the page at which trouble occurred.

In order to attain the foregoing object, a preferred embodiment of the present invention discloses a printing apparatus and a printing processing method in which, when trouble occurs during execution of printing processing, information representing the page at which the trouble occurred is outputted in the form of the page number from the start of print processing.

Further, there are disclosed a printing apparatus and a printing processing method in which, when trouble occurs during execution of printing processing, trouble-occurrence information, which includes information representing the page at which the trouble occurred in the form of the page number from the start of printing processing, is outputted.

Further, there are disclosed a printing apparatus and a printing processing method in which count information is initialized or counted up in dependence upon the result of discriminating the content of print information, and trouble-occurrence information based upon the value of the count information is outputted if occurrence of trouble during processing of the print information is sensed.

Another object of the invention is to make it unnecessary for a computer that has issued a print instruction to perform complicated calculation of the page at which the trouble occurred, even in double-sided printing.

In order to attain the foregoing object, a preferred embodiment of the present invention discloses a printing apparatus and a printing processing method in which count information is initialized or counted up in dependence upon the result of discriminating the content of print information and, if occurrence of trouble during processing of the print information is sensed, information representing the page at which the trouble occurred, which has been calculated from the count information based upon whether the page at which the trouble occurred is an odd-numbered page or an even-numbered page, is outputted upon being included in trouble-occurrence information.

In accordance with the present invention, as described above, there can be provided a printing apparatus and a printing processing method in which formation indicating at what page from the start of a printing job a trouble such as jamming occurred is sent back to the computer that issued the print instruction. As a result, the computer that has received this trouble-occurrence information is capable of rapidly ascertaining at which page the trouble occurred.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

A printer embodying the present invention will now be described in detail with reference to the accompanying drawings.

In the embodiments set forth below, an example is described in which the present invention is applied to a page printer such as a laser-beam printer. However, this does not impose a limitation upon the invention, which can be applied also to an ink-jet printer, a copier having an interface with external equipment, etc.

Figure 1:
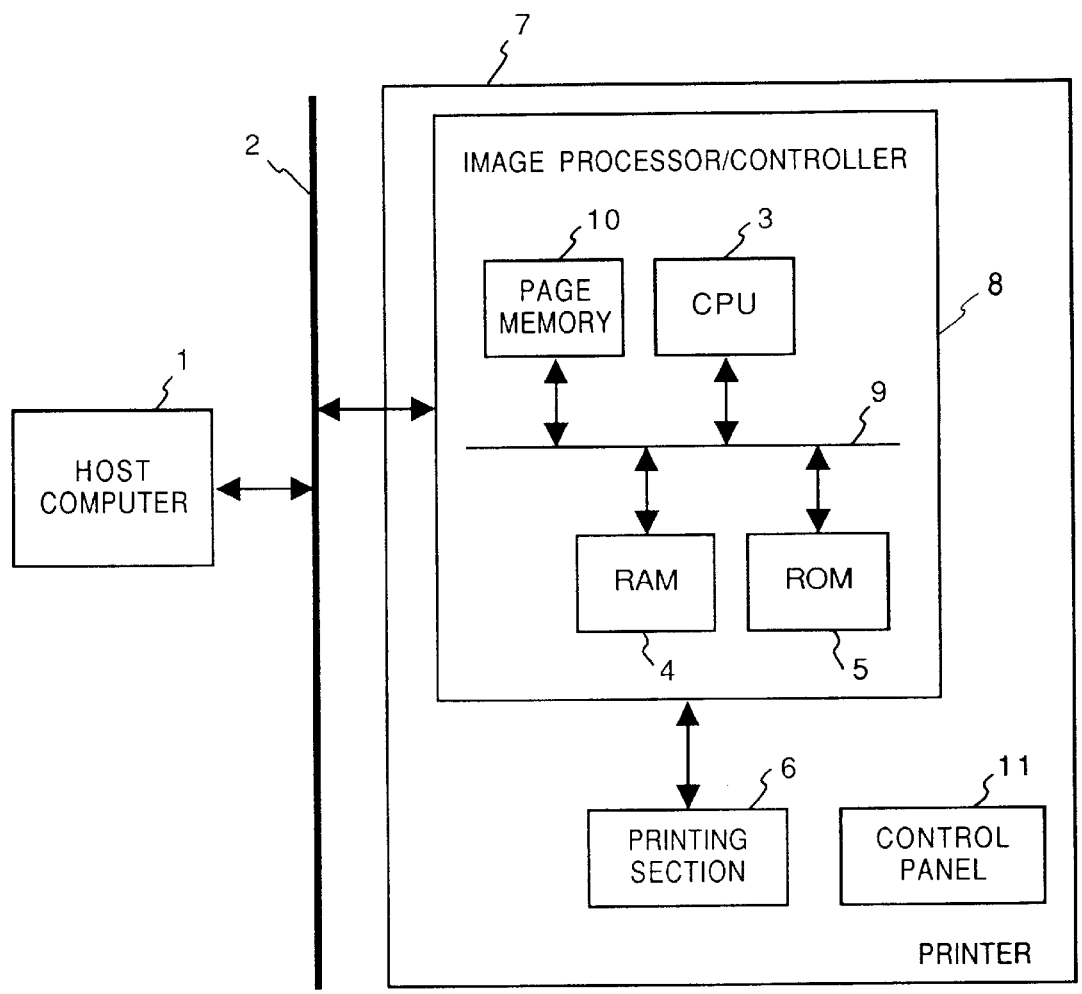
FIG. 1 is a block diagram illustrating the construction of a printer according to a first embodiment of the present invention.

FIG. 1 is a block diagram showing the construction of a printer according to a first embodiment of the invention.

As shown in FIG. 1, a printer 7 according to this embodiment is a page printer such as a laser-beam printer and includes a printing section 6 and an image processor/controller 8 comprising a CPU 3, a RAM 4, a ROM 5 and a page memory 10.

The CPU 3 in the image processor/controller 8 executes image processing of input print information in accordance with a program stored in the ROM 5, etc. Further, the CPU 3 receives signals from sensors (not shown) at various points in the printing section via an I/O unit (not shown), senses the operating state of the printing section 6 and controls the entirety of the printer 7, inclusive of the printing section 6, via a CPU bus 9 and signal lines, which are not shown. Accordingly, using as a reference the page of print information that it is currently processing, the CPU 3 ascertains where in the printing section 6 (e.g., the image forming unit, the fixing unit, the paper discharge unit, etc.) a sheet of recording paper on which an image of several pages previous has been recorded is located. It should be noted that the sensors include devices for sensing jamming, unprinted sheets, printing density, etc.

The RAM 4 functions as a working memory of the CPU 3 and temporarily stores print information such as character patterns.

The page memory 10 has enough capacity to store one page of image information of size A4, by way of example.

A control panel 11 is equipped with an LCD panel, indicators and the like for displaying information from the CPU 3, as well as a keyboard or touch panel manipulated by the user in order to enter commands. In accordance with commands entered from the control panel 11, the CPU 3 sets the operating conditions of the printer 7 and causes the operating conditions of the printer 7 and the operating state thereof, etc., to be displayed on the control panel 11.

It should be noted that the CPU 3, RAM 4, ROM 5, page memory 10 and control panel 11 are interconnected by the CPU bus 9.

Further, numeral 1 denotes an external device such as a host computer which, via a cable 2 forming a LAN or the like, sends the printer 7 print information inclusive of image information and control codes and the like for subjecting the image information to image processing or for outputting the same. The print information may be expressed in the form of page description language (hereinafter referred to as "PDL").

The CPU 3 analyzes the entered print information and develops the information in the page memory 10. The image that has been developed in the page memory 10 is sent to the printing section 6, where the image is recorded on recording paper or the like.

Figure 2:
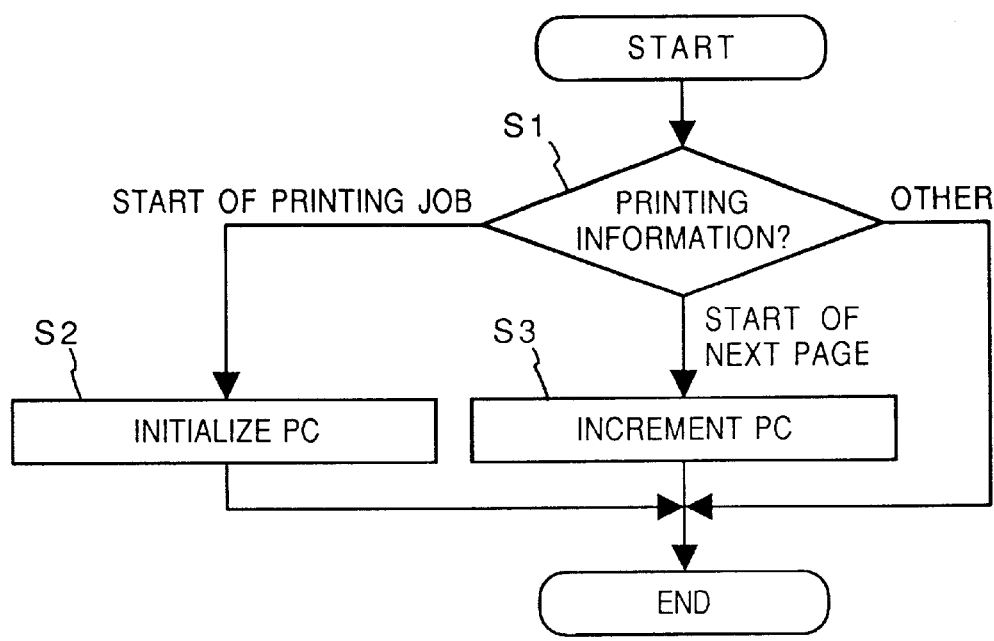
FIG. 2 is a flowchart illustrating a page counting procedure according to the first embodiment.

FIG. 2 is a flowchart illustrating a page counting procedure according to this embodiment. This procedure is incorporated in a well-known print processing procedure stored in the ROM 5 and is executed by the CPU 3 whenever print information enters.

As shown in FIG. 2, the processing executed by the CPU 3 branches at step S1 in dependence upon the entered print information. More specifically, if this information signifies "start of printing job", a variable PC is initialized to "1", for example, at step S2, after which processing is terminated. It should be noted that "start of printing job" is discriminated when a printing-job start instruction defined by PDL is entered, or when print information is entered anew in a case where the print information does not possess a printing-job start instruction.

In a case where the information signifies "start of next page", the variable PC is incremented at step S3, after which processing is terminated. Print information discriminated as indicating "start of next page" may be a page-eject instruction.

If the information signifies neither "start of printing job" nor "start of next page", then processing is terminated directly.

More specifically, the variable PC functions as a counter for counting the number of pages from "start of printing job". By referring to the variable PC, it is possible to ascertain, by counting pages from the start of the printing job, the page number of the page currently undergoing processing. The variable PC is set in an internal register of the CPU 3 or in the RAM 4.

As mentioned earlier, there is a technique for outputting trouble-occurrence information, which is information indicating "jamming occurred X pages prior to page now being processed", by way of example. In this embodiment, however, trouble-occurrence information indicating "jamming occurred at (PC−x)th page", for example, is outputted based upon a value obtained by subtracting X from the variable PC. Since this information is sent to the host computer 1 via the cable 2, the host computer 1 can be notified of the trouble, such as jamming, in a format identical with that of the page information managed by the computer.

Figure 3:
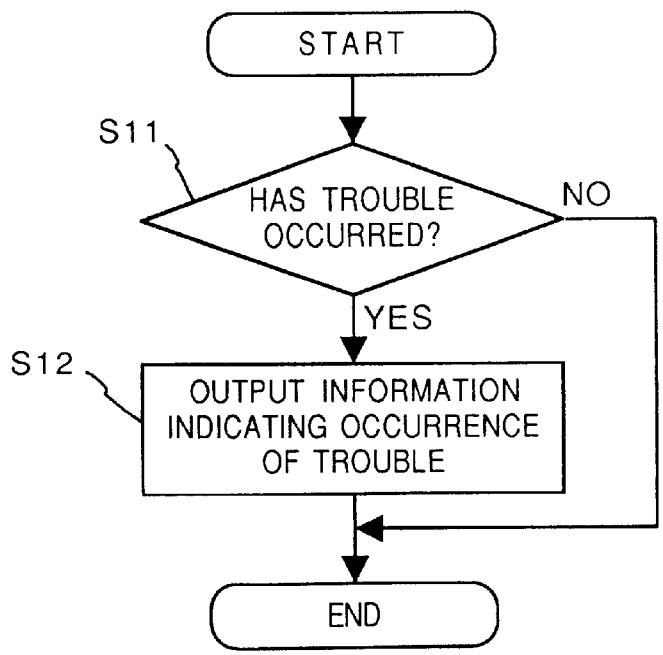
FIG. 3 is a flowchart illustrating a procedure according to the first embodiment for a case where trouble has occurred.

FIG. 3 is a flowchart illustrating a procedure in a case where jamming has occurred. This procedure is incorporated in a well-known print processing procedure stored in the ROM 5 and is executed by the CPU 3 at a prescribed printing period during execution of printing.

As shown in FIG. 3, the occurrence of trouble is discriminated at step S11. If trouble has occurred, trouble-occurrence information is outputted at step S12. If the trouble that has occurred is jamming, then the trouble-occurrence information "jamming occurred at (PC−x)th page" is outputted, as set forth above. If no trouble has occurred, then processing is terminated directly.

It should be noted that the procedure for the case in which trouble has occurred is not limited to that shown in FIG. 3. For example, the aforesaid trouble-occurrence information may be outputted by interrupt processing, for example, if trouble has occurred.

Figure 4:
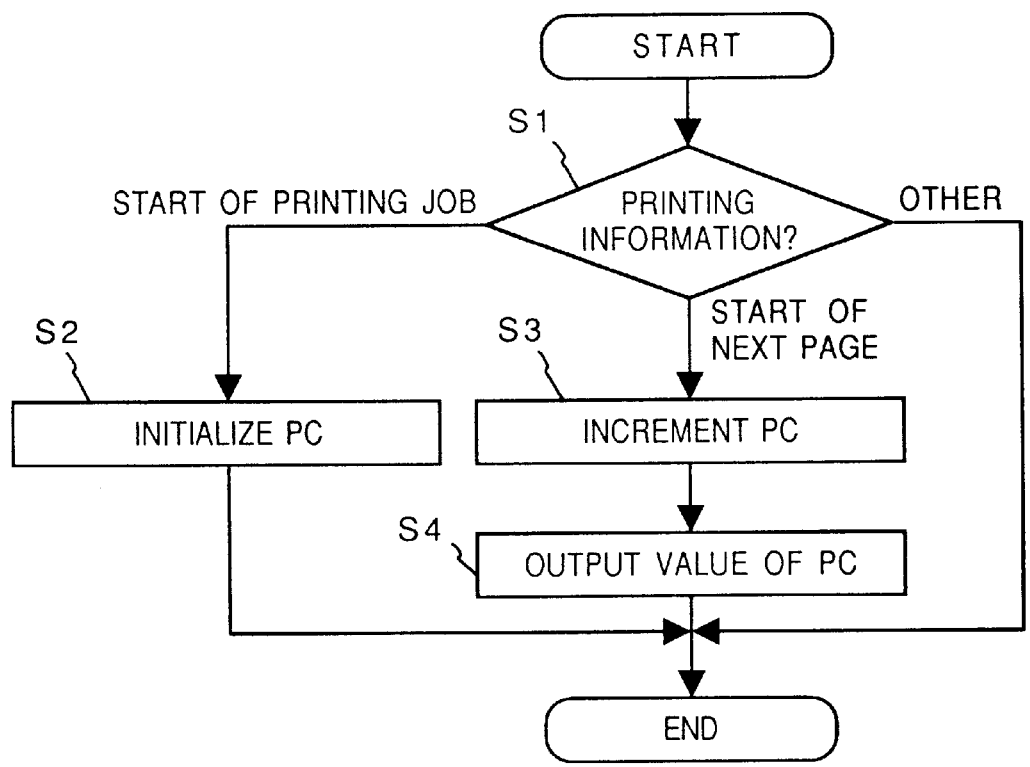
FIG. 4 is a flowchart illustrating a procedure for outputting the value of a variable whenever print information signifying "start of next page" enters according to the first embodiment.

FIG. 4 is a flowchart illustrating a procedure for outputting the value of the variable PC whenever print information signifying "start of next page" enters. Steps identical with those in the flowchart of FIG. 2 are designated by like step numbers.

In accordance with the procedure shown in FIG. 4, the value of the variable PC is outputted at step S4 whenever print information signifying "start of next page" enters. As a result, the host computer 1 is capable of ascertaining which page of the transmitted print information is being processed.

Furthermore, the CPU 3 is capable of utilizing the variable PC to display, on the control panel 11, the number of the page currently being processed or the number of pages that have already been printed.

In accordance with this embodiment, as described above, the arrangement is such that if trouble such as jamming has occurred during print processing, information indicating at what page from the start of the printing job the jamming occurred can be sent back to the host computer that issued the command for this printing job, and the host computer is capable of obtaining trouble-occurrence information in a format identical with that of the page information management by the host computer. As a result, it is unnecessary for the host computer to newly calculate page information indicative of the page at which the trouble occurred.

A printer according to a second embodiment of the present invention will now be described.

In the first embodiment, an example was described in which printing is performed on only one side of a page. In the example of the second embodiment, however, printing is performed on both sides. If trouble such as jamming occurs at a certain page in double-sided printing, it is necessary to request re-transmission of print information corresponding to whichever page number came first, namely the number of the page at which the trouble occurred or the number of page on the opposite side. In the description that follows, it is assumed that an odd-numbered page is printed after an even-numbered page. However, it goes without saying that printing may be performed in the reverse of this order.

Figure 5:
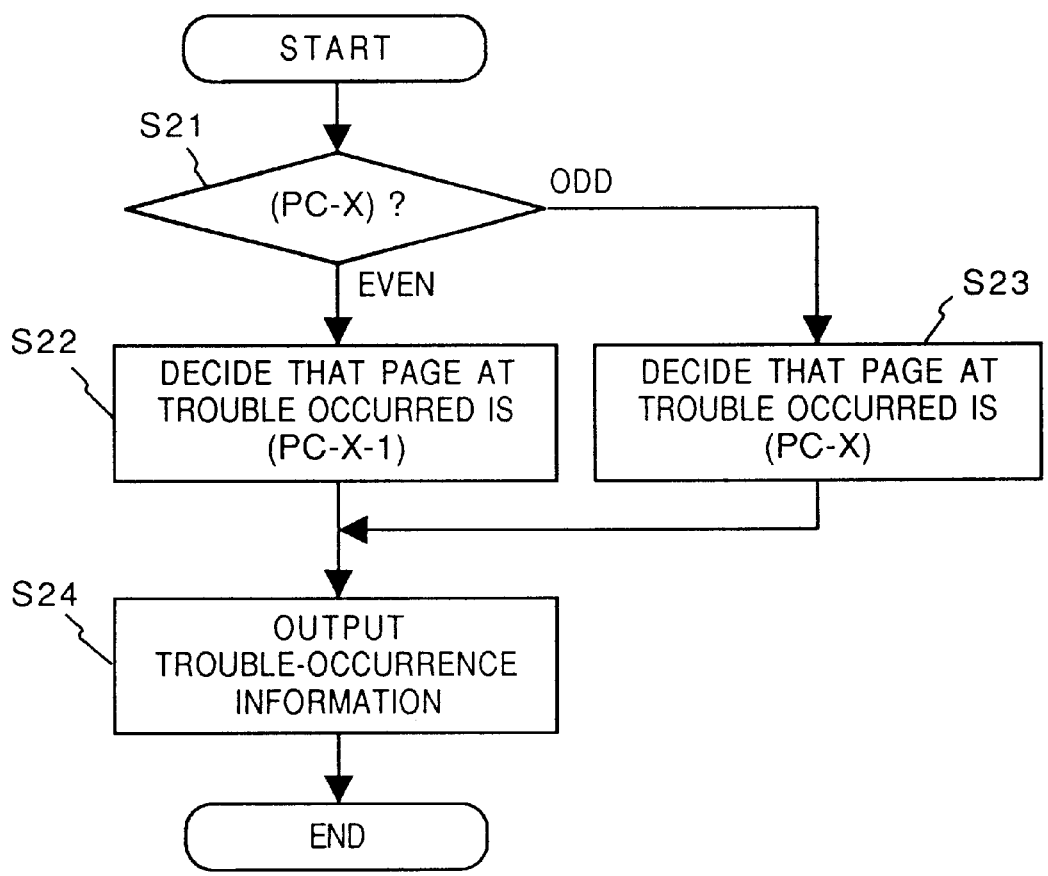
FIG. 5 is a flowchart illustrating a procedure for outputting counter information according to a second embodiment of the present invention.

FIG. 5 is a flowchart illustrating a procedure for outputting counter information. This procedure is incorporated in a well-known print processing procedure stored in the ROM 5 and is executed by the CPU 3 when trouble such as jamming occurs.

As step S21 in FIG. 5, the CPU 3 discriminates the value obtained by subtracting X from the variable PC. If (PC–X) is an even number, i.e., if the page number is an even number, then the CPU 3 decides at step S22 that the page at which the trouble occurred is (PC–X–1). If (PC–X) is an odd number, i.e., if the page number is an odd number, then the CPU 3 decides at step S23 that the page at which the trouble occurred is (PC–X). After the decision regarding the page number, the trouble-occurrence information is outputted at step S24, whereupon processing is terminated.

In accordance with the second embodiment, as described above, effects similar to those of the first embodiment are obtained. In addition, if trouble occurs during doubled-sided printing, information indicating which page from the start of a printing job is the page requiring a request for re-transmission is sent back to the host computer that issued the instruction for the printing job. After recovery from the problem, therefore, problems such as missing pages and a reversal in the correct order of odd- and even-numbered pages on the front and back sides of the recording paper do not arise.

In a case where the trouble that has occurred is the absence of recording paper or a decline in printing density as caused by insufficient toner, trouble-occurrence information indicating "recording paper ran out at (PC–X)th page" and "printing density declined at (PC–X)th page", respectively, can be outputted in each of the embodiments described above. Upon being notified of this trouble-occurrence information, the host computer 1 or the user can take such measures as causing another printer to print out the data from the (PC–X)th page onward.

Furthermore, the destination of this trouble-occurrence information is not limited to the host computer that issued the print instruction; it can be communicated to other computers as well. If this is done, the user (especially a network manager) of the computer that has received the trouble-occurrence information is capable of ascertaining the fact that the trouble occurred. Moreover, if the user of the host computer is not present, recovery from the trouble can be carried out by someone acting for the user.

Further, if total page number T of the printing job is appended to the print information from the host computer 1, the CPU 3 can subtract the value of the variable PC from the total page number T, thereby ascertaining after how many pages the present printing job will end. The remaining number of pages (T–PC) determined can be displayed on the control panel 11 or communicated to another computer via the cable 2. Accordingly, the other computer or the user thereof can ascertain the operating state of the printer. This means that when a new printing job is sent out, it is possible to decide, based upon whether the printer has finished the current job, whether it is better to send the new job to this printer or send it to another printer.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus capable of obtaining loss information which indicates page numbers of pages lost when a jam occurs while performing print processing, said apparatus comprising:

analyzing means for analyzing print data received from a host apparatus to generate image data, and detecting a command included in the print data, which indicates ejection of a page to obtain a current page number of the page which is developed to print an image;

calculating means for calculating a difference between the current page number and the page numbers of pages indicated by the loss information to calculate a page number of a first jammed page when a jam has occurred; and outputting means for outputting the page number of the first jammed page to the host apparatus.

2. The apparatus according to claim 1, wherein said analyzing means initializes the current page number when a command included in the print data for start of the print processing is analyzed.

3. The apparatus according to claim 1, further comprising a mechanism to print both sides of a page.

4. The apparatus according to claim 3, wherein said calculating means subtracts one from the calculated page number when double-sided printing is performed and the calculated difference is an even number.

5. A printing method for a printing apparatus capable of obtaining loss information which indicates the page numbers of pages lost when a jam occurs while performing print processing, said method comprising the steps of:

analyzing print data received from a host apparatus to generate image data, and detecting a command included in the print data, which indicates an ejection of a page to obtain a current page number of the page which is developed to print an image;

calculating a difference between the current page number and the page numbers of pages indicated by the loss information to calculate a page number of a first jammed page when a jam has occurred; and outputting the page number of the first jammed page to the host apparatus.

6. The method according to claim 5, wherein in the analyzing step, the current page number is initialized when a command included in the print data for start of the print processing is analyzed.

7. The method according to claim 5, wherein the printing apparatus comprises a mechanism to print both sides of a page.

8. The method according to claim 7, wherein in the calculating step, subtracting one from the calculated page number when double-sided printing is performed and the calculated difference is an even number.

9. A printing apparatus capable of obtaining loss information which indicates page numbers of pages lost when a jam occurs while performing print processing, said apparatus comprising:

analyzing means for analyzing print data received from a host apparatus to generate image data, and for detecting a command included in the print data that indicates an ejection of a page so as to obtain a current page number of a page which is developed;

calculating means for calculating a page number of a first jammed page using the formula:

PC−X=JP, wherein PC is the page number of the current page, X is the number of pages lost due to the jam, and JP is the first jammed page; and outputting means for outputting the page number of the first jammed page to the host apparatus.

10. The apparatus according to claim 9, wherein when said apparatus performs double-sided print processing and (PC−X) is an even number, said calculating means calculates the page number of the first jammed page using the formula:

PC−X−1=JP.

* * * * *

UNITED STATES PATENT AND TRADEMARK OFFICE
CERTIFICATE OF CORRECTION

PATENT NO. : 6,048,115
DATED : April 11, 2000
INVENTOR(S) : Masaki Unishi et al.

It is certified that error appears in the above-identified patent and that said Letters Patent is hereby corrected as shown below:

Title page,
Item [56] under FOREIGN PATENT DOCUMENTS, "146780" (second document cited) should read -- 1-46780 --;
"1227168" (third document cited) should read -- 1-227168 --;
"3155974    7/1991    Japan........400/74" should be deleted;
"5162409" (twelth document cited) should read -- 5-162409 --; and
"5233177" (thirteenth document cited) should read -- 5-233177 --.
Item [57] line 5, "of the" should read -- if the --.

Column 2,
Line 13, "formation" should read -- information --.

Column 5,
Line 13, "As" should read -- At --.

Column 6,
Line 56, "subtracting one" should read -- one is subtracted --.

Signed and Sealed this

Twenty-seventh Day of November, 2001

Attest:

NICHOLAS P. GODICI
*Attesting Officer*    *Acting Director of the United States Patent and Trademark Office*